April 13, 1965  J. D. LARSON  3,178,267
AUTOMATIC CONTROL OF DIGESTER FOR CONVERTING INORGANIC
MATERIAL INTO ASSIMILABLE PLANT FOOD
Filed July 25, 1962
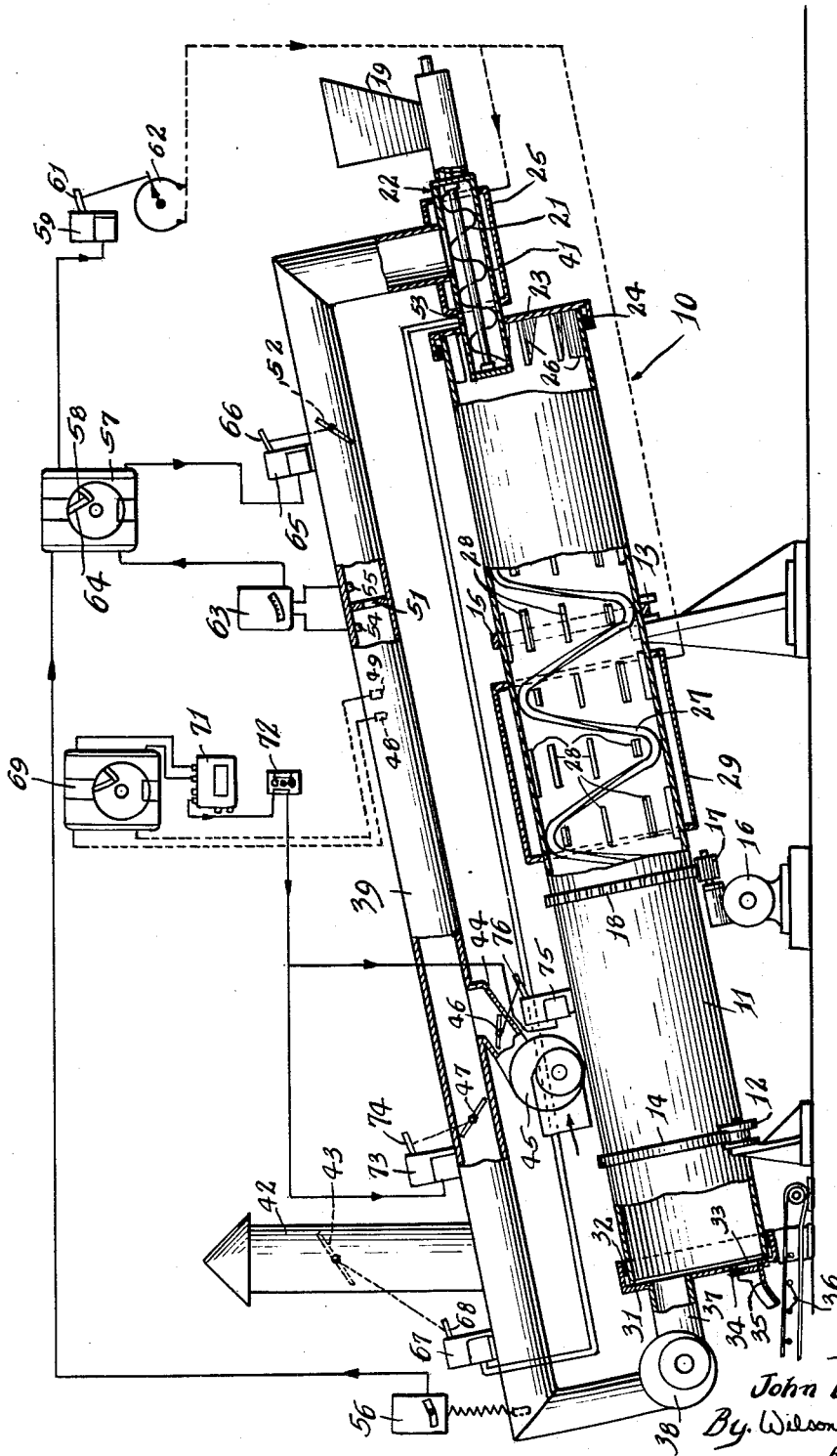
Inventor.
John D. Larson.
By. Wilson & Geppert
Attorneys.

United States Patent Office 3,178,267
Patented Apr. 13, 1965

3,178,267
AUTOMATIC CONTROL OF DIGESTER FOR CONVERTING INORGANIC MATERIAL INTO ASSIMILABLE PLANT FOOD
John D. Larson, P.O. Box 162, Hinsdale, Ill.
Filed July 25, 1962, Ser. No. 212,388
8 Claims. (Cl. 23—259.1)

The present invention relates to the production of organic fertilizers readily assimilable by growing vegetation, and more particularly to an improved apparatus and method for the production of such material by treatment of phosphate rock or other inorganic material to convert the same to organic readily assimilable material under controlled conditions of temperature, pressure and humidity.

An important object of the present invention is the provision of a digester including a rotatable drum of substantial length through which the components of the ultimate product are slowly passed while being agitated and thoroughly mixed and at the same time subjected to a carefully controlled fermentation action.

Another important object of the present invention is the provision of a digester having a closed recirculation system to expedite and augment the fermentation reaction by circulating through the drum a mixture of air and gases resulting from the fermentation reaction.

A further object of the present invention is the provision of automatic control of the variables of temperature, humidity, pressure and the rate of circulation of air and gas flow through the digester so as to enable the final product to be produced during a single passage through the drum in a minimum amount of consumed time.

The present invention further comprehends the provision of a method of forming readily assimilable plant food from inorganic materials under proper conditions of temperature, pressure, humidity and agitation. This method provides a plant food with a minimum of insoluble residue left in topsoil treated with the plant food of organic phosphates made in the digester of the present invention.

Further objects are to provide a construction and arrangement of maximum simplicity, efficiency, economy and ease of assembly and operation, and such further objects, advantages and capabilities as will later more fully appear and are inherently possessed thereby.

The present invention is an improvement on my Patent No. 2,948,593, issued August 9, 1960, relating to a digester for producing readily assimilable plant food.

In the drawing which discloses an illustrative embodiment of the present invention, the digester is shown in side elevation and partially in cross section with a schematic showing of the sensing and recording control instruments.

Referring more particularly to the drawing, the digester 10 which comprises a drum 11 of any preferred dimensions and capacity is rotatably supported, preferably in inclined position, by spaced supporting rollers 12 and 13. Circular tracks 14 and 15 are secured to the drum 11 in spaced relation to rest upon the spaced rollers. Rotary movement is imparted to the drum through a drive motor 16 operating a drive pinion 17 meshing with a ring gear 18 also secured to the exterior of the drum 11. The drum is preferably inclined in that it aids in the travel of the contents from the intake end to the delivery end.

The components which are converted into the final assimilable plant food comprise approximately 75% inorganic material, 24% organic material, and 1% of an expediter. The inorganic material consists of such materials as granite, limestone, clay and gypsum or like materials of raw phosphate rock. The organic materials include sewage sludge, horse manure, peat and humus, and the expediter includes lignin, yeast and corn steeping liquor. The organic matter contains numerous chelating agents and soil bacteria which induce the dissolution of rock phosphate.

Although manure and sewage sludge are predominant in the organic material, these ingredients are preferred but not necessary as other suitable materials include ground garbage, cannery waste, cotton seed meal, castor bean pomace, tankage, and other analogous organic ingredients.

As an illustrative example, a preferred organic mixture includes approximately 40% sewage sludge, 20% manure, 20% peat and 20% humus. The expediter comprises corn steep liquor and substantially equal portions by weight of lignin and dried yeast.

The inorganic materials are first pulverized to pass through a 200 mesh screen and mixed with the organic materials, preferably passing through an 8 mesh screen, in the desired proportions, whereupon the mixture is deposited in the hopper 19 and fed to the intake end of the drum 11 by a screw conveyor 21 driven by any suitable source of power. The conveyor screw 21 is housed in a conduit 22 which extends through the stationary end 23 of the drum, with a suitable annular gasket or sealing ring 24 acting to form a seal between the rotating drum 11 and the stationary end 23. A heating jacket 25 surrounds a substantial portion of the conduit to aid in controlling the temperature of the fermentation reaction.

The drum is slowly rotated at a speed of approximately four revolutions per hour. To prevent the material delivered from the conduit 22 from accumulating at the intake end of the drum, a series of angularly arranged wings or deflectors 26 are spaced around the interior surface of the drum. To aid in and insure propulsion of the materials through the drum, a spiral web or flange 27 is secured to the interior surface of the drum, and a series of agitating blades or flanges 28 are secured to and extend inwardly from the drum's interior surface or inner circumference. As the drum rotates, the blades 28 carry the materials upwardly until they drop by gravity thereby enhancing agitation and mixing as well as aeration by the gases circulating through the drum. Surrounding the central portion of the drum is a second heating jacket 29 to aid in providing the proper reaction conditions for the materials passing therethrough.

The end wall 31 at the discharge end of the drum 11 is stationarily supported and an annular sealing gasket 32 similar to the gasket or sealing ring 24 acts to seal the space between the end wall 31 and the rotating drum. A discharge opening 33 through the end wall 31 is constructed to be totally or partially closed by a vertical sliding gate 34. The delivered product is directed from the opening 33 by a discharge spout 35 to a suitable endless conveyor 36 by which the product is transported to a place of storage or a truck for further transportation. In practice, the gate 34 will be closed when operaion is initiated and will remain closed until the treated material arrives at the discharge end of the drum, whereupon the gate will be partially opened to allow discharge of the processed or final product and remain in the partially open position to allow for continuous discharge of the resulting product.

During the travel of the materials from one end of the drum to the opposite end, which is regulated to occur in approximately twenty-four hours, the materials being mixed and propelled are at the same time subjected to a fermentation action induced and augmented by the circulation of gases through the drum. This fermentation generates heat and various gases which are withdrawn from the discharge end of the drum 11 through a conduit 37 by an exhaust fan 38, the intake of which communicates with the conduit 37 and the discharge of which communicates with a return conduit 39. This conduit 39 is shown extending upward and then rearward alongside or parallel to the drum 11 and then downward entering an enlarged portion 41 of the conduit 22 within the heating jacket 25. A short stack 42 communicating with the conduit 39 is located near the discharge end of the drum and contains a damper member 43.

Intermediate the ends of the conduit 39 is a diagonally positioned and relatively short tube 44 connected to a fan or blower 45 for supplying fresh air. A damper member 46 controls the fresh air flow into conduit 39 from the blower 45. Between the short stack 42 and the diagonally positioned tube 44 is another damper member 47, and further along the conduit 39 are wet and dry bulb temperature sensing elements 48 and 49, respectively, followed closely by a partition having an orifice 51, and above or beyond this orifice is a fourth damper member 52. A pressure tap 53 is located in the enlarged portion 41 of the conduit 22 adjacent the stationary end 23 of the digester, and pressure taps 54 and 55 are positioned on the opposite sides of the orifice 51.

There are four variable factors to be considered in the fermentation reaction occuring within the digester; these are oxidation or air flow, temperature, humidity and mechanical agitation. The pressure within the digester has also been found to be interrelated with the factors named above. The mechanical agitation for this reaction is constant as the rate of rotation of the drum is constant at approximately four revolutions per hour. The preferred temperature range for the gases passing through the conduit 39 is 90–95° F., although the temperature of reaction within the digester may reach 135–140° F. The preferred moisture content for the gases is 10–18%. The control assembly is designed to provide equilibrium of the oxidation or air flow, temperature and humidity by controlling the temperature, pressure, humidity and rate of gas flow in the system. These factors are controlled through the heating jackets 25 and 29 and the damper members 43, 46, 47 and 52.

A temperature transmitter 56 has a thermocouple or other temperature sensing element in the conduit 39 and transmits a pneumatic signal to a recording unit 57 which translates the signal for indication by a recorder pen 58 and transmits a signal by a controlling pilot to operate a control drive 59. This control drive acting through an arm 61 adjusts a rheostat 62 which controls the heating jackets 25 and 29. The recording unit 57 includes the recording pen to indicate the temperature of the gases and suitable control elements to retain the temperature within the preferred temperature range.

Also connected with the recording unit 57 is a gas flow transmiter 63 which is connected to the pressure taps 54 and 55 at each side of the orifice 51. Knowing the pressure differential across the orifice and the size of the orifice, the gas flow rate can be easily determined in the transmitter 63 and an impulse sent to the recording unit 57. Changes in gas flow rate are recorded by a second recording pen 64 and signals are transmitted to the control drive 65 having an arm 66 to control movement of the damper member 52. Thus the gas flow is controlled within requisite limits.

A control drive with a diaphragm controller 67 having a control arm 68 is connected with the pressure tap 53 in the conduit 22 to determine the pressure in the digester. The arm 68 is connected to the damper member 43 in the short stack 42 to adjust the pressure in the system within prescribed limits.

The wet and dry bulb temperature sensing elements 48 and 49, respectively, in the conduit 39 communicate with a second recording unit 69 having recording pens to show these values. The recording unit 69 sends impulses for both temperature values to a computing relay 71 which produces a control signal according to the preferred humidity range and sends this signal to a selector station 72. This selector station has provision for either manual or automatic operation and in turn transmits signals to the control drives 73 and 75. Control drive 73 has an arm 74 connected to the damper member 47 in the conduit 39, and control drive 75 has an arm 76 connected to the damper member 46 in the diagonal short tube 44 from the blower 45. Control of these two damper members 46 and 47 determines the quantity of fresh air to be added to the gas flow in the system to adjust the humidity of the gas stream.

To recapitulate, the temperature control for the system is provided in a closed loop single-element control. Likewise, the gas flow rate is also a closed loop single-element control. The pressure control for the digester is a single-element direct connected closed loop control as the control function is built into the control drive 67. These control elements are all independent of the selector station 72 which controls the humidity of the system through a computing relay 71. It can be seen, however, that although the controls for the variables are independent, each control function will have a mutual interaction with respect to all other control points. Thus, if the control drives 73 and 75 are adjusted to obtain the proper humidity, this adjustment will necessarily affect the temperature, air flow and pressure in the digester. Likewise, any adjustment of either of the last mentioned three variables will also affect all of the other variables, and all controls must be properly dimensioned and adjusted. One can also see that the computing relay 71 and selector station 72, although not directly controlling the variables of temperature, pressure and gas flow, does provide a multiple action to provide a substantial equilibrium of these four factors to obtain optimum fermentation of the organic and inorganic materials within the digester during a twenty-four hour period and deliver at the discharge end of the digester a completely oxidized finished product at the expiration of twenty-four hours.

Having thus disclosed the invention, I claim:

1. A digester for processing and converting inorganic material into assimilable plant food, comprising an elongated rotary drum, means for rotating said drum, a feed conveyor for introducing the material to be processed into one end of said drum, means for discharging the processed material from the opposite end of said drum, means for agitating and propelling the material from the feeding end to the discharge end of said drum, heating means surrounding the intermediate portion of said drum, separate heating means surrounding said feed conveyor, a main conduit extending from the discharge end of the drum back to the feed conveyor, a blower in said main conduit adjacent said discharge end drawing the gases in the system through the drum, a stack located in said main conduit downstream of said blower, a damper member in said stack, pressure control means adjusting the position of said damper, a diagonal short conduit intersecting said main conduit, a blower in said short conduit for drawing fresh air into said main conduit, a damper member in said short conduit, an orifice plate in said main conduit downstream of said short conduit, a third damper member in said main conduit downstream of said orifice plate, flow rate control means adjusting the position of said third damper member, and means to automatically control the humidity and temperature of the gaseous flow through said main conduit.

2. A digester for processing and converting inorganic material into assimilable plant food as set forth in claim 1, including a fourth damper member in said main conduit between said stack and said short conduit, said humidity control means controlling the adjustment of the damper member in the short conduit and the fourth damper member.

3. A digester for processing and converting inorganic material into plant assimilable food as set forth in claim 1, in which pressure taps are positioned on each side of said orifice plate and are in communication with said flow rate control means, and a pressure tap is located in the feed conveyor adjacent the feed end of said drum and communicates with said pressure control means.

4. A digester for processing and converting inorganic material into assimilable plant food as set forth in claim 1, in which wet and dry bulb temperature sensing elements are positioned in said main conduit and communicate with said humidity control means, and an additional temperature responsive element is located adjacent said stack and controls actuation of said heating means.

5. A digester for processing and converting inorganic material into assimilable plant food, comprising an elongated rotary drum, means for rotating said drum, a feed conveyor for introducing the material to be processed into one end of said drum, means for discharging the processed material from the opposite end of said drum, means for agitating and propelling the material in the drum from the feeding end to the discharge end, heating means for said drum and said feed conveyor, a main conduit extending from the discharge end of said drum to said feed conveyor, a fan in said conduit adjacent said discharge end of the drum drawing gases through the drum from said conveyor, a temperature sensing element in said conduit downstream of the fan, a stack positioned in said conduit having a damper member therein, a diagonally arranged short conduit intersecting said main conduit, a second damper member in said main conduit between said stack and said short conduit, a blower for drawing fresh air through said short conduit into said main conduit, a third damper member in said short conduit, wet bulb and dry bulb temperature sensing elements in said main conduit, an orifice plate in said main conduit downstream of said temperature sensing elements, pressure taps on each side of said orifice plate in said main conduit, a fourth damper member in said main conduit downstream of said orifice plate, a pressure tap in said feed conveyor, and control means communicating with the temperature responsive elements, pressure taps, and damper members to control the temperature, pressure, humidity and gas flow in the system.

6. A digester for processing and converting inorganic material into assimilable plant food as set forth in claim 5, including separate heating jackets surrounding the rotary drum and the feed conveyor, and a rheostat controlling the temperature of the heating jackets responsive to temperature changes recorded by said first mentioned temperature sensing element.

7. A digester for processing and converting inorganic material into assimilable plant food as set forth in claim 5, including a heating jacket surrounding the central portion of the rotary drum and a separate heating element surrounding the feed conveyor, and said control means including a temperature transmitter connected to said first mentioned temperature sensing element, a recording unit receiving signals from said temperature transmitter, a first control drive receiving signals from said recording unit, a rheostat communicating with said heating jackets and adjusted by said control drive, a diaphragm controller and control drive communicating with the pressure tap in the feed conveyor and adjusting the first damper member, a gas flow transmitter communicating with the pressure taps on each side of said orifice plate and with said recording unit, a control drive communicating with said recording unit and adjusting said fourth damper member, a second recording unit communicating with said wet and dry bulb temperature responsive elements, a computing relay communicating with said second recording unit, a selector station communicating with said computing relay, and control drives communicating with said selector station and adjusting said second and third damper members.

8. A digester for processing and converting inorganic material into assimilable plant food, comprising an elongated inclined rotary drum, means for rotating said drum, a feed conveyor for introducing the material to be processed into one end of said drum, means for delivering the processed material from the other end of the drum, means for agitating and propelling said material in said drum from said feed conveyor to said delivery means, heating means about said feed conveyor, separate heating means about the central portion of said drum, a conduit withdrawing hot gases from the delivery end of said drum and transmitting said hot gases to the feed conveyor, an exhaust fan communicating with said conduit and drawing the hot gases through said drum and into said conduit to be propelled toward said feed conveyor, a stack in said conduit and positioned downstream of said fan, means controlling exit of gases through said stack with relation to the pressure in the drum, a second conduit communicating with said first conduit downstream of said stack, means drawing fresh air through said second conduit to mix with the circulating gases to control the humidity of said gases, and means in said first conduit downstream of said second conduit measuring and controlling the rate of flow of gases through said conduit and drum.

References Cited by the Examiner
UNITED STATES PATENTS

| | | | |
|---|---|---|---|
| 2,098,054 | 11/37 | McBerty | 23—286 |
| 2,856,272 | 10/58 | Baeyaert | 23—286 |
| 2,864,672 | 12/58 | Brooks | 23—259.1 |
| 2,885,279 | 5/59 | Mortenson | 71—64 |
| 2,948,593 | 8/60 | Larson | 23—259.1 |

DONALL H. SYLVESTER, *Primary Examiner.*

ANTHONY SCIAMANNA, *Examiner.*